March 11, 1952

W. K. ARCHER 2,588,604

METHOD OF SEALING HOLLOW BODIES, SUCH AS BOTTLES
AND SIMILAR CONTAINERS OF PLASTIC MATERIAL

Filed Oct. 15, 1949

Inventor
*William K. Archer*
By *Fishburn & Mullendore*
Attorneys

Patented Mar. 11, 1952

2,588,604

UNITED STATES PATENT OFFICE 2,588,604

METHOD OF SEALING HOLLOW BODIES, SUCH AS BOTTLES AND SIMILAR CONTAINERS OF PLASTIC MATERIAL

William K. Archer, Kansas City, Mo., assignor to Injection Molding Company, Kansas City, Mo., a corporation of Missouri Application October 15, 1949, Serial No. 121,603

5 Claims. (Cl. 18—59)

1

This invention relates to a method of sealing hollow bodies, such as bottles and similar containers, of thermo-plastic material. It has been difficult to form hollow bodies and particularly bottle-shaped containers from plastic materials in high production dies for the reason that the neck openings are not of sufficient size to permit withdrawal of the core element of the mold. It has been proposed to produce such containers in two parts, that is, the body of the container is molded in high pressure dies with an open bottom of sufficient size to permit withdrawal of the core element and the open bottom subsequently closed by a separately molded part. However, much difficulty has been encountered in satisfactorily sealing the bottom member in position within the body of the container and particularly in consistently providing leakproof containers on a high production scale.

It is, therefore, the principal object of the present invention to provide a plastic container with a body part having an open bottom closed by an insert that is adapted to be heat-sealed on an inexpensive mass production scale and assure against defective containers.

Other objects of the invention are to provide the parts to be sealed together with fusible portions and to provide sufficient heat and pressure to melt and force the molten material of the fusible portions together and into a sealing groove for forming a substantially autogenous weld and to maintain the bottom shape of the container while the heat pressure is being applied. It is also an object of the invention to confine flow of the fused material and thereby provide smoothly finished seals.

In accomplishing these and other objects of the invention as hereinafter pointed out, I have provided an improved method, the preferred forms of which are illustrated in the accompanying drawing, wherein:

Fig. 1 is side elevational view of an apparatus for sealing a bottom closure within an open bottom hollow body member to provide a leaktight container in accordance with the present invention, and showing a work member therein.

Fig. 2 is an enlarged sectional view through the heating head and supporting member, showing the body member and closure in position ready for sealing.

Fig. 3 is a similar view showing the heating head moved into position relative to the supporting member for fusing and forcing the fused material into sealing contact while maintaining the peripheral shape of the finished container.

2

Fig. 4 is a partial bottom perspective view of a container prior to sealing in of the bottom closure.

Fig. 5 is a similar view after the insert has been sealed to the body of the container.

Referring more in detail to the drawings:

1 designates a hollow body such as a bottle-shaped container having a side wall 2 that may be of cylindrical formation and a dome-shaped top 3 provided with a neck 4 of substantially smaller diameter than the inner diameter of the wall 2. Since the opening in the neck 4 is of small diameter, the opposite end of the body portion is left open to permit withdrawal of the core when the body portion of the container is formed of plastic in a high production mold. It is, therefore, necessary to design the bottom portion of the wall 2 to receive a bottom closure 5 in accordance with the present invention. The end of the container opposite the neck 4 is provided with an annular base flange or opened wall portion 6 that extends circumferentially of the wall 2 to provide a thickened portion sufficient to accommodate inner annular faces 7 and 8 offset outwardly from the inner surface of the wall 2 by annular shoulders 9 and 10. The base flange 6 also provides an external annular shoulder 11 on which the body member is supported in inverted position within the sealing apparatus, as later described. The faces 7 and 8 may be cylindrical and the shoulders 9 and 10 formed at right angles thereto. Projecting outwardly from the end of the base flange 6 is a coaxial annular lip 12 having an inner face 13 formed as a continuation of the face 7 and an outermost annular face 14 tapering inwardly toward the axis from a point offset from the peripheral face 15 of the base flange 6 to join with the inner face 7 in a substantially thin edge 16, as best shown in Fig. 4.

The closure member 5 includes a disklike portion 17 having a diameter to be snugly slidable within the annular face portion 8 of the body member and to seat upon the shoulder 10, as shown in Fig. 4. Inset slightly from the circumferential face of the disk portion is an annular substantially right angularly disposed flange 18 having an outer face 19 cooperating with the face 7 of the body member to provide an annular sealing groove 20 therebetween. The inner surface of the flange 18 tapers outwardly in stepped annular faces 21 and 22 separated by an offset 23 substantially in plane with the terminal face of the flange 6. The face 21 conforms to the taper of the lip portion 12 previously described, and joins with the face 19 in a relatively thin edge 24 providing a lip portion 12'.

In carrying out the present invention, the body member of the container is suspended within a sleevelike supporting member 25 that is carried by a suitable frame 26, and which has an inner cylindrical face 27 of a diameter to snugly receive the body portion of the container when it is slid therein. The upper end of the member 25 terminates in a flat face 28 and extending inwardly therefrom is a counterbore 29 of a diameter to slidably receive the base flange portion 6 and provide an internal annular shoulder 30 for seating the shoulder 11 of the body member whereby the body member is suspended and confined by the supporting member to resist deformation by pressure applied by the heating head 31.

The heating head 31 has a substantially flat annular face 32 corresponding with the face 28 and which is provided with an annular rib 33 provided with an outwardly and upwardly tapering outer peripheral face 34 and a substantially flat lower face 35, the rib being of a depth so that the face 35 does not make contact with the outer face of the disk portion of the bottom member when the heating and pressure head is moved into position for effecting seal of the lip portions of the container. The heating and pressure head 31 may be otherwise of any suitable shape and is provided with a recess 36 for receiving a heat element 37 which may be of the electrical type and by which the pressing head is heated to supply the heat necessary in fusing the lip portions 16 and 24. The heating and pressing head is carried on a piston rod 38 of an actuating cylinder 39 to be moved to and from sealing position with respect to the supporting member 25. The actuating cylinder 39 may be suitably carried by part of the frame 26 and the head guided into position by means of a guide rod 40 that is also carried by the frame 26 and which is slidably engaged by an arm 41 of the heating and pressing head, as shown in Fig. 1.

In effecting a seal of a container constructed as described, the bottom closure 5 is applied in the open bottom of the body portion of the container to seat against the annular shoulder 10. The flange 18 is directed outwardly and surrounded by the end wall portion 6, and the flange 18 and wall portion 6 terminate substantially in the same plane to present continuous outer terminal ends. In this position, the lip portions of the respective parts of the container are in aligning registry, as shown in Fig. 2. The container is then slid into the bore of the support 25 when the heating head 31 is in retracted position, and a suitable material is placed between the head and the container so as to prevent sticking of the fused material of the lips 12 and 12'. With the operation of the machine, the head 31 moves downwardly until the tapering surface 34 engages the inner lip 12' and presses the inner lip outwardly into contact with the outer lip 12. As the material heats, the lips fuse together and the pressure applied by the head 31 as the head approaches the surface 28 of the support 25 effects a complete seal and forces the fused material into position for filling the groove 20 between the lips, as shown in Fig. 3. While the pressure is being applied, the base flange 6 of the container is supported in position to maintain the shape thereof. After the heat and pressure seal has been effected, the heating and pressing head is moved to retracted position and the container is withdrawn from the supporting member 25.

From the foregoing, it is obvious that I have provided a container construction and method of making the same, which permits use of plastic material and wherein closure is sealed in the body member to form a leak-tight container, so that the container may be readily and inexpensively formed of plastic material.

What I claim and desire to secure by Letters Patent is:

1. The method of permanently securing a thermoplastic closure to an open end wall portion of a thermoplastic container, the closure and end wall portion being of substantially complementary size and shape with the closure having a continuous substantially right angularly disposed flange on its outer face substantially at the margin thereof, which comprises inserting the closure into the open end wall portion of the container with the flange facing outwardly and terminating in substantially the same plane as the end wall portion of the container whereby said flange is surrounded by the end wall portion thus presenting continuous outer terminal ends, supporting said end wall portion of the container about the entire perimeter thereof to maintain the outer shape of said end wall portion, applying heat and pressure directly to and coextensive with said terminal ends to fuse portions thereof and flow together the fused material, applying pressure to the innerside of said flange to support said flange relatively to the surrounding end wall portion, confining flow of the fused material from spreading beyond the outer and inner perimeters of said end wall portion and flange respectively, and removing the heat and pressure and allowing the fused material to set to form an integral seal between the flange of the closure and the end wall portion of the container.

2. The method of permanently securing a thermoplastic closure to an open end wall portion of a thermoplastic container, there being an annular stop shoulder inwardly of the open end of the container, the closure and end wall portion being of substantially complementary size and shape with the closure having a continuous substantially right angularly disposed flange on its outer face substantially at the margin thereof, which comprises inserting the closure into the open end wall portion of the container to engage the annular stop shoulder with the flange facing outwardly and terminating in substantially the same plane as the end wall portion of the container whereby said flange is surrounded by the end wall portion thus presenting continuous outer terminal ends, supporting said end wall portion of the container about the entire perimeter thereof to maintain the outer shape of said end wall portion, applying heat and pressure directly to and coextensive with said terminal ends to fuse portions thereof and flow together the fused material, applying pressure to the innerside of said flange to support said flange relatively to the surrounding end wall portion, confining flow of the fused material from spreading beyond the outer and inner perimeters of said end wall portion and flange respectively, and removing the heat and pressure and allowing the fused material to set to form an integral seal between the flange of the closure and the end wall portion of the container.

3. The method of permanently securing a thermoplastic closure to an open end wall portion of a thermoplastic container, the closure and end wall portion being of substantially complementary size and shape with the closure having a continuous substantially right angularly disposed flange on its outer face substantially at the margin thereof and adapted to form with the end wall portion an outwardly opening recess therebetween which comprises inserting the closure into the open end wall portion of the container with the flange facing outwardly and terminating in substantially the same plane as the end wall portion of the container whereby said flange is surrounded by the end wall portion thus presenting continuous outer terminal ends and forming the outwardly opening recess therebetween, supporting said end wall portion about the entire perimeter thereof to maintain the outer shape of said end wall portion, applying heat and pressure directly to and coextensive with said terminal ends to fuse portions thereof and flow together the fused material into said recess, supporting the innerside of said flange, confining the fused material for flow into said recess and from spreading beyond the outer and inner perimeters of said end wall portion and said flange respectively, removing the heat and pressure and allowing the fused material to set to form an integral seal between the flange of the closure and the end wall portion of the container.

4. The method of permanently securing a thermoplastic closure to an open end wall portion of a thermoplastic container, the closure and end wall portion being of substantially complementary size and shape with the closure having a continuous substantially right angularly disposed flange on its outer face substantially at the margin thereof and adapted to form with the end wall portion an outwardly opening recess therebetween and the flange and end wall portion having continuous outwardly projecting lips, which comprises inserting the closure into the open end wall portion of the container with the flange facing outwardly and terminating in substantially the same plane as the end wall portion of the container whereby said flange is surrounded by the end wall portion thus forming the outwardly opening recess therebetween and presenting the continuous outwardly projecting lips in side-to-side relation, supporting said end wall portion about the entire perimeter thereof to maintain the outer shape of said end wall portion, applying heat and pressure directly to and coextensive with said lips to fuse said lips and flow together the fused material, supporting the innerside of said flange, confining the fused material for flow into said recess and from spreading beyond the outer and inner perimeters of said end wall portion and said flange respectively, removing the heat and pressure and allowing the fused material to set to form an integral seal between the flange of the closure and the end wall portion of the container.

5. The method of permanently securing a thermoplastic closure to an open end wall portion of a thermoplastic container, there being an annular stop shoulder inwardly of the open end of the container, the closure and end wall portion being of substantially complementary size and shape with the closure having a continuous substantially right angularly disposed flange on its outer face substantially at the margin thereof and adapted to form with the end wall portion an outwardly opening recess therebetween and the flange and end wall having continuous outwardly projecting lips, which comprises inserting the closure into the open end wall portion of the container to seat on said stop shoulder with the flange facing outwardly and terminating in substantially the same plane as the end wall portion of the container whereby said flange is surrounded by the end wall portion thus forming the outwardly opening recess therebetween and presenting the continuous outwardly projecting lips in side-to-side relation, supporting said end wall portion about the entire perimeter thereof to maintain the outer shape of said end wall portion, applying heat and pressure directly to and coextensive with said lips to fuse said lips and flow together the fused material, supporting the innerside of said flange, confining the fused material for flow into said recess and from spreading beyond the outer and inner perimeters of said end wall portion and said flange respectively, removing the heat and pressure and allowing the fused material to set to form an integral seal between the flange of the closure and the end wall portion of the container.

WILLIAM K. ARCHER.

REFERENCES CITED

The following references are of record in the file of this patent:

UNITED STATES PATENTS

| Number | Name | Date |
| --- | --- | --- |
| Re. 18,433 | Barker | Apr. 19, 1932 |
| 304,252 | Beher | Aug. 26, 1884 |
| 1,352,161 | Willard | Sept. 7, 1920 |
| 1,421,748 | Willard | July 4, 1922 |
| 1,678,330 | Clyne | July 24, 1928 |
| 2,041,357 | Kraft | May 19, 1936 |
| 2,219,576 | Moreland | Oct. 29, 1940 |
| 2,386,498 | Ostrander | Oct. 9, 1945 |

FOREIGN PATENTS

| Number | Country | Date |
| --- | --- | --- |
| 559,111 | Great Britain | Feb. 4, 1944 |